(12) United States Patent
Difasi et al.

(10) Patent No.: US 6,264,210 B1
(45) Date of Patent: Jul. 24, 2001

(54) QUICK-CHANGE JAW CHUCK SYSTEM

(75) Inventors: Anthony J. Difasi, Horseheads; Matthew C. Roberts, Jr., Wayland, both of NY (US)

(73) Assignee: Hardinge Inc., Elmira, NY (US)

( * ) Notice: Subject to any disclaimer, the term of this patent is extended or adjusted under 35 U.S.C. 154(b) by 0 days.

(21) Appl. No.: 09/388,934

(22) Filed: Sep. 2, 1999

Related U.S. Application Data (60) Provisional application No. 60/099,316, filed on Sep. 4, 1998.

(51) Int. Cl.$^7$ .................................................. B23B 31/16
(52) U.S. Cl. ........................... 279/124; 279/123; 279/152; 269/282
(58) Field of Search ................................ 279/123, 124, 279/152–154, 110; 269/262, 282

(56) References Cited

U.S. PATENT DOCUMENTS

| Re. 29,533 | 2/1978 | Parsons . | |
|---|---|---|---|
| 4,387,905 | 6/1983 | Brown . | |
| 4,667,971 | * 5/1987 | Norton et al. | 279/123 |
| 4,722,536 | * 2/1988 | Lane et al. | 279/123 |
| 5,464,232 | * 11/1995 | Chizmadia | 279/124 |

FOREIGN PATENT DOCUMENTS

| 47096 | * 3/1982 | (EP) | 279/124 |
|---|---|---|---|

* cited by examiner

Primary Examiner—Steven C. Bishop
(74) Attorney, Agent, or Firm—Pillsbury Winthrop LLP (57) ABSTRACT

A jaw assembly for a jaw chuck for holding a workpiece to the spindle of a machine, such as a lathe, includes an intermediate coupling member that engages a master jaw slot formed in a master jaw which is disposed in a radial guide formed in the body of the chuck. A retaining mechanism secures the intermediate coupling member within the master jaw slot. A top jaw is configured to be connectively engaged with the intermediate coupling member by inserting the intermediate coupling member into a top jaw slot. The top jaw is held securely to the intermediate coupling member, and, accordingly, to the master jaw, when the retaining mechanism is tightened. During top jaw change-out the retaining mechanism is released, thereby permitting the top jaw to be disengaged from the intermediate coupling member while still loosely retaining the intermediate coupling member within the master jaw slot. A new top jaw is installed by merely engaging it with the intermediate coupling member and then re-tightening the retaining mechanism.

17 Claims, 5 Drawing Sheets

QUICK-CHANGE JAW CHUCK SYSTEM

This application claims benefit of provisional application No. 60/099,316 filed Sep. 4, 1998.

The present invention is related to a jaw assembly for a jaw chuck for holding a workpiece to a spindle of a machine.

BACKGROUND OF THE INVENTION

A jaw chuck for holding a work piece to the spindle of a rotary machine, such as a lathe, includes three or more jaw assemblies coupled to a chuck body for simultaneous reciprocating radial movement with respect to the chuck body to provide self-centering gripping of the workpiece. In a typical construction, each jaw assembly is attached to a master jaw disposed for radial movement within one of a number of radial jaw guides formed in the body. Each master jaw is coupled to a draw bar, disposed within the spindle of the machine, by a pivoting lever arm that actuates the master jaws by converting axial movement of the draw bar into the simultaneous reciprocating radial movement of the master jaws.

While the master jaws are rarely disassembled from the chuck body, the jaw assemblies or workpiece gripping jaws, are often removed from and reattached to the master jaws so that different jaw assemblies can be installed on the chuck so as to accommodate work pieces of different sizes and/or shapes. Each master jaw has a slot formed therein with retaining flanges extending along opposite edges of the slot. A top jaw is attached to the master jaw by means of two or more threaded fasteners extending through spaced-apart holes formed in the top jaw and into a single T-nut having two or more threaded holes or two or more one-hole T-nuts disposed in the master jaw slot. The fasteners are tightened into the T-nut(s) to draw the top jaw down into bearing contact with the master jaw. The respective surfaces of the master jaw and the top jaw that bear against each other are serrated to prevent sliding of the top jaw with respect to the master jaw.

This conventional method of attaching a top jaw to a master jaw has a number of disadvantages. Since the top jaw is attached to the master jaw with two or more threaded fasteners, the time required to change out the top jaws is greater than it would be if only one fastener were required to securely attach the top jaw to the master jaw. To attach a top jaw to the master jaw, each fastener must be placed through a hole formed in the top jaw and then aligned with and threaded into a T-nut disposed in the master jaw slot. Alternatively, the T-nuts can be started onto the ends of the fasteners protruding from the top jaw and then the loosely attached T-nuts are slid into the master jaw slots. The top jaw is then properly positioned with respect to the master jaw and both fasteners are tightened to secure the top jaw.

To remove the top jaw and install a new top jaw, both fasteners must be loosened, and the fasteners and T-nut(s) must be transferred to the next top jaw or the next top jaw must have its own dedicated fasteners and T-nut(s).

Also, to ensure rotational symmetry of the chuck and self centering gripping of the jaws, each top jaw must be positioned in the same location on its respective master jaw. For example, if the third serration of the top jaw is aligned with the first serration of the master jaw, then all top jaws should be aligned the same way. Aligning the top jaws can be cumbersome, because the serrated bearing surfaces makes it difficult to slide the top jaws with respect to the master jaws; both threaded fasteners must be sufficiently loose to permit adequate play between the top jaw and the master jaw.

SUMMARY OF THE INVENTION

These disadvantages are overcome in accordance with the present invention by a quick-change jaw assembly for a jaw chuck for holding a workpiece to the spindle of a machine, the jaw chuck including a rotatable chuck body with radially-extending jaw guides formed therein and a master jaw disposed for reciprocal radial movement within each of the jaw guides, the master jaw having a master jaw slot formed therein with retaining flanges formed along opposed sides of the master jaw slot. The jaw assembly comprises an intermediate coupling member that is slidable into the master jaw slot. The intermediate coupling member has a first flange structure that co-acts with the retaining flanges of the master jaw to retain the intermediate coupling member in the master jaw slot and a second flange structure.

A top jaw has a top jaw slot formed therein and retaining tabs disposed along opposite sides of the top jaw slot. The top jaw slot can receive a portion of the intermediate coupling member with the retaining tabs in overlying relation with the second flange structure of the intermediate coupling member.

A retaining mechanism secures the intermediate coupling member within the master jaw slot, thereby retaining the top jaw to the master jaw by co-action of the retaining tabs of the top jaw and the second flange structure of the intermediate coupling member.

The intermediate coupling member and the retaining mechanism stay coupled to the master jaw as the top jaw is changed out. Therefore, changing the top jaw is dramatically simplified. To remove a top jaw from the chuck, the retaining mechanism is released, thereby permitting the top jaw to be disengaged from the intermediate coupling member. The new top jaw is then engaged with the intermediate coupling member already disposed in the master jaw and the retaining mechanism is again tightened, thereby securing the intermediate coupling member and the new top jaw to the master jaw. Furthermore, the intermediate coupling member and the top jaw preferably include positioning protrusions for accurate and repeatable positioning of the intermediate coupling member with respect to the master jaw and the top jaw with respect to the intermediate coupling member.

In a preferred embodiment, the jaw assembly includes a spring plunger disposed between the intermediate coupling member and the master jaw. When the retaining mechanism is released, the bias of the plunger holds the intermediate coupling member somewhat elevated with respect to the master jaw. Accordingly, when a top jaw is engaged with the intermediate coupling member while the retaining member is released, the intermediate coupling member holds the top jaw out of contact with the master jaw, thereby permitting the top jaw to be easily slid into it proper position with respect to the master jaw.

Other objects, features, and characteristics of the present invention, as well as the methods of operation of the invention and the function and interrelation of the elements of structure, will become more apparent upon consideration of the following description and the appended claims with reference to the accompanying drawings, all of which form a part of this disclosure, wherein like reference numerals designate corresponding parts in the various figures.

DETAILED DESCRIPTION OF THE PREFERRED EMBODIMENT

For convenience in the following description, various directional or other spatial references are made with regard to references to the drawings. It is understood, however, that such references, including without limitation, front, back, forward, rearward, upper, lower, top, bottom, left, right, lateral, or longitudinal, are made for convenience only and should not be construed to be limiting on the invention described herein.

Figure 1:
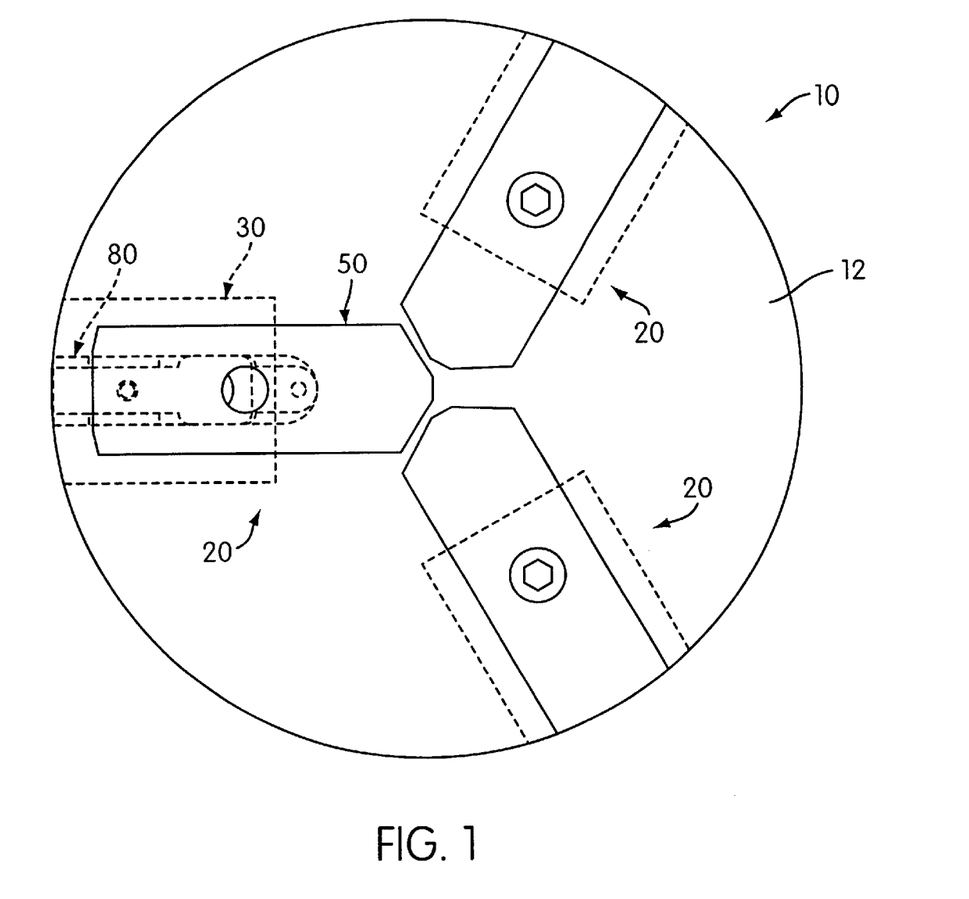
FIG. 1 is a plan view of a three-jaw chuck including quick-change jaw assemblies according to the present invention.
Figure 2:
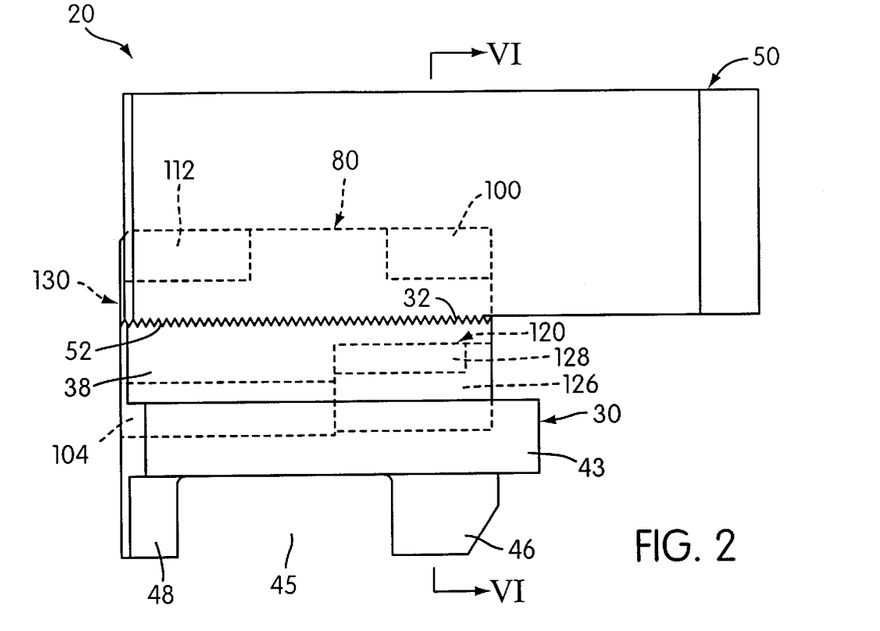
FIG. 2 is a side elevation of a jaw assembly according to the present invention.

A jaw chuck for holding a workpiece to the spindle of a machine, such as a lathe, is generally indicated by reference number 10 in FIG. 1 and includes jaw assemblies 20 constructed and arranged in accordance with the present invention. In the illustrated embodiment, jaw chuck 10 includes three jaw assemblies 20, although those skilled in the art will recognize that two or more jaw assemblies may be provided. The jaw chuck 10 includes a chuck body 12 having formed therein radial slots 14 (see FIG. 4), each of which includes jaw guides 15. With the exception of the jaw assemblies 20, the jaw chuck 10 may be an essentially conventional lever-operated jaw chuck, wherein the jaw assemblies are coupled, via a pivoting lever arm, to an axially movable draw bar of the machine. Axial movement of the draw bar is converted to simultaneous reciprocal radial movement of the jaw assemblies to provide self-centering gripping of the workpiece.

Figure 4:
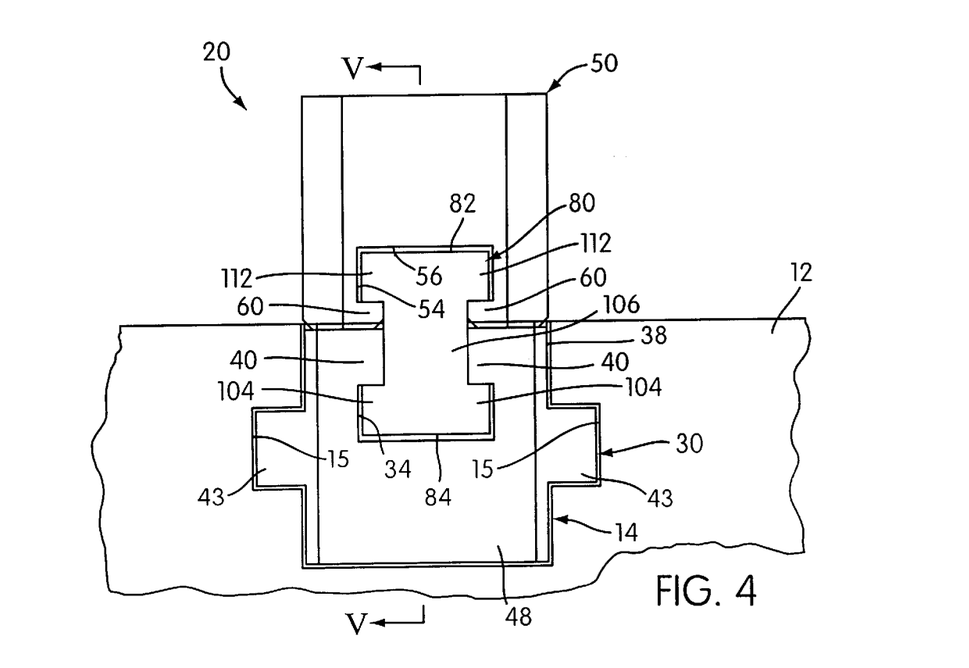
FIG. 4 is a partial end elevation of the jaw chuck showing an end of the jaw assembly.

A master jaw 30 is disposed within each of the radial slots 14. Each master jaw 30 includes an upper body portion 38 disposed above step portions 43 extending laterally therefrom. A front actuating lug 46 and a rear actuating lug 48 extend below the step portions 43. As shown in FIG. 4, the master jaw 30 presents an end-wise profile generally conforming to the radial slot 14 in which the master jaw 30 is disposed for radial movement with respect to the chuck body 12, with step portions 43 received within jaw guides 15.

The front actuating lug 46 and rear actuating lug 48 of the master jaw 30 define a gap 45 therebetween. Gap 45 is engaged by an actuating pivoting lever (not shown) located inside the chuck body 12 for moving the master jaw 30, and thereby the jaw assembly 20 attached to the master jaw 30, inwardly and outwardly within the radial slot 14. The actuating lever is operatively coupled to a draw bar (not shown) of a machine, such as a lathe, for moving the master jaws 30 and jaw assemblies 20 radially inwardly and outwardly with respect to the chuck body 12 in correspondence to movement of the draw bar. Lever-operated jaw chucks are generally known to those skilled in the art and will not be further described herein.

Figure 5:
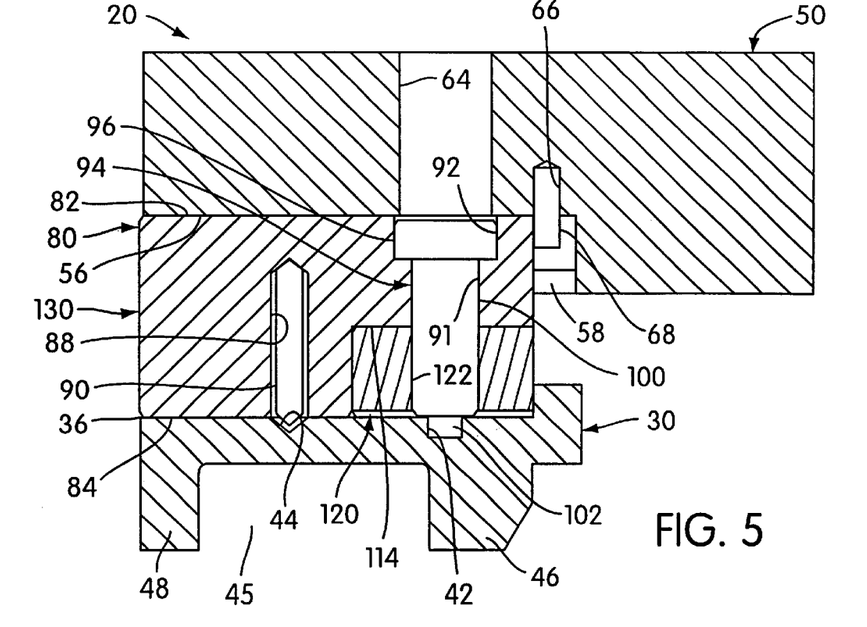
FIG. 5 is a cross-section along the line V—V in FIG. 4.
Figure 6:
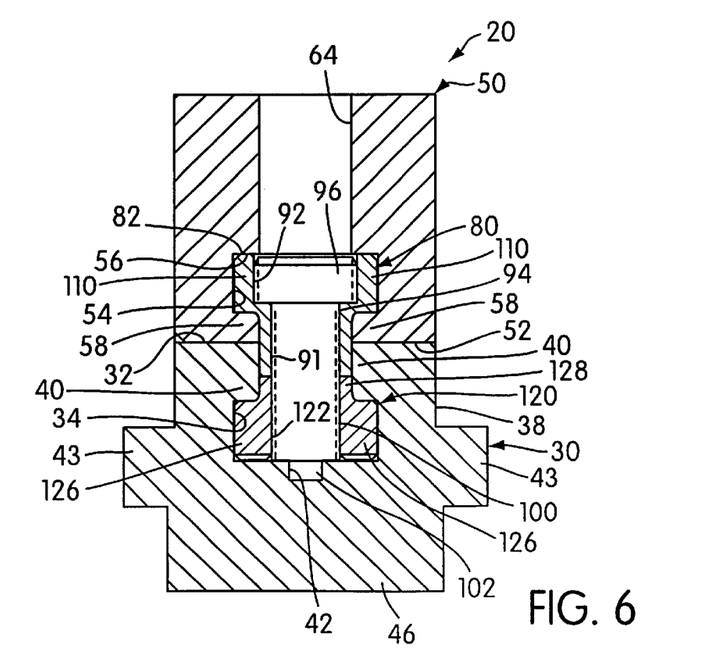
FIG. 6 is a cross-section along the line VI—VI in FIG. 2.
Figure 7:
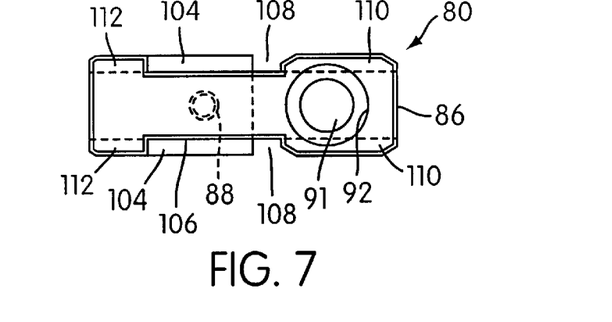
FIG. 7 is a top plan view of an intermediate coupling member of the jaw assembly.
Figure 8:
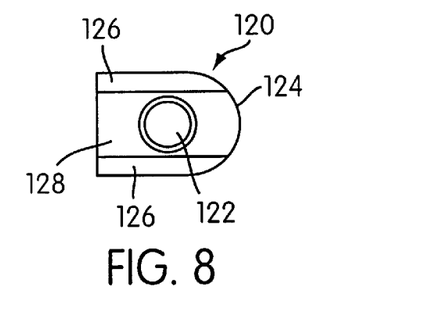
FIG. 8 is a top plan view of a retaining member of the jaw assembly.

Master jaw 30 further includes serrations 32 formed along a top surface of the body portion 38. A slot 34 is formed longitudinally through the master jaw 30, and inwardly facing retaining flanges 40 are provided on opposite sides of the slot 34, as best seen in FIGS. 4 and 6. The master jaw 30 may comprise a conventional master jaw typically employed in a lever-operated jaw chuck, except that the jaw 30 is modified to include a flat-bottomed pilot hole 42 and a conical detent 44 formed along a bottom surface of the slot 34 (see FIGS. 3 and 5). Master jaw 30 is preferably made from 8620 steel hardened to a Rockwell C hardness of 50 to 55.

As shown in FIGS. 2–6, each jaw assembly 20 includes a top jaw 50 coupled to an associated master jaw 30 by an intermediate coupling assembly 130, which, in the preferred embodiment, includes an intermediate coupling member 80 and a retaining mechanism preferably comprising a screw 94 extending through an aperture 91 formed in the intermediate coupling member 80 and a retaining member 120, such as a T-nut, engaged by the screw 94 to secure the top jaw 50 to the master jaw 30, as will be described in more detail below.

Top jaw 50 is preferably made from 1018 steel and includes serrations 52 formed along a bottom surface thereof. Serrations 52 of the top jaw 50 and serrations 32 of the master jaw 30 may be of any pitch and the individual teeth may be of any profile angle, but it is preferred that the serrations 52 of the top jaw 50 mate with the serrations 32 of the master jaw 30.

Figure 9:
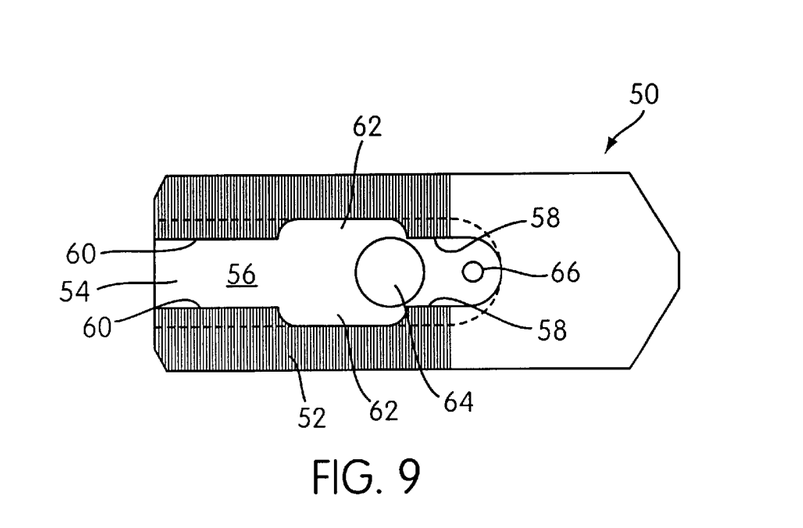
FIG. 9 is a bottom plan view of a top jaw of the jaw assembly.

A longitudinal slot 54 extends from one end of the top jaw 50 to an intermediate location within the top jaw 50. Forward slot tabs 58 extend inwardly along opposed edges of a forward portion of the slot 54, and rear slot tabs 60 extend inwardly along a rearward portion of the slot 54. Forward slot tabs 58 and rearward slot tabs 60 are longitudinally separated by an installation relief opening 62, as best shown in FIG. 9. A clearance aperture 64 is formed centrally through the top jaw 50 and communicates with the slot 54.

A locating pin 68 is installed in an aperture 66 formed in a forward portion of the top surface 56 of the slot 54. Intermediate coupling member 80 includes a top surface 82 and a bottom surface 84. Coupling member 80 further includes a web section 106 with a lower flange 104, a rear top flange 112, and a forward top flange 110 extending laterally from the web section 106, with a clearance notch 108 defined between the longitudinally-spaced top flanges 110, 112. A rectangular clearance notch 114 is removed from a front lower corner of the coupling member 80. Through-hole 91 extends through a forward portion of the coupling member 80, and a counterbore 92 is coaxially formed with the through-hole 91 at the top surface 82 of the coupling member 80. A tapped hole 88 formed in coupling member 80 receives a spring plunger schematically shown at reference number 90. Plunger 90 includes a body with external threads formed on the outer surface thereof, a tip disposed within the body, and a spring disposed within the body for biasing the tip to extend out of the body.

The retaining member 120 includes a threaded aperture 122 formed therethrough. Lateral steps 126 are formed along opposite sides of the retaining member 120, thereby defining a central upper projection 128.

Both the retaining member 120 and the coupling member 80 are preferably formed from 4140 steel hardened to a Rockwell C hardness of 40–45.

Set up of the jaw assembly 20 will now be described.

To set up a master jaw, such as master jaw 30, for use with quick change jaw assemblies in accordance with the present invention, the retaining member 120 is positioned in the clearance notch 114 of the intermediate coupling member 80 and is assembled loosely to the intermediate coupling member 80 with the screw 94, to form the intermediate coupling assembly 130 including the intermediate coupling member 80, the screw 94, and the retaining member 120. Screw 94 includes a head 96, preferably with a female hex end, a threaded shaft 100, and a pilot end 102. Screw 94 is inserted through the opening 91, the head 96 being accommodated by the counterbore 94, and shaft 100 is threaded into the threaded aperture 122 of the retaining member 120. Screw 94 also includes a pilot end 102. For the initial assembly of the retaining member 120 to the intermediate coupling member 80, screw 94 is only loosely turned into the retaining member 120 so that the pilot end 102 of the screw 94 does not project from the bottom of the retaining member 120.

The intermediate coupling assembly 130, including the screw 94, retaining member 120, and intermediate coupling member 80, is inserted into the slot 34 of the master jaw 30. The leading end of the retaining member 120 is preferably rounded to facilitate insertion. To insert the intermediate coupling member 80 into the slot 34 of the master jaw 30, the tip of the spring plunger 90 must be manually depressed into the body of the spring plunger 90 to clear the tip of the plunger 90 past the front lip 36 of the slot 34. In an alternate master jaw configuration (not shown), a ramped notch in the master jaw slot can be used to cam the tip of the plunger into the body of the plunger as the intermediate coupling member 80 is inserted into the master jaw slot.

The lower flange 104 of the intermediate coupling member 80 and the lateral steps 126 of the retaining member 120 are accommodated within the slot 34 below the retaining flanges 40. Retaining flanges 40 thereby retain the intermediate coupling member 80 and the retaining member 120 to prevent separation of the coupling member 80 and retaining member 120 from the master jaw 30 in a direction perpendicular to the bottom of the slot 134.

The intermediate coupling member 80 and the retaining member 120 are slid as far as possible into the slot 34. In the preferred embodiment of the present invention, retaining member 120 includes an arcuate leading edge 124 that generally conforms to an arcuate forward portion (not shown) of slot 34. With the retaining member 120 and intermediate coupling member 80 inserted all the way into the slot 34 of the master jaw 30, the pilot end 102 of the screw 94 will be aligned with the pilot hole 42 and the spring plunger 90 will line up with and engage the conical detent 44 of the master jaw 30 to facilitate proper positioning of the intermediate coupling assembly 130 with respect to the master jaw 130. The screw 94 is tightened and is then backed off approximately ½ to 2 turns and preferably about one turn to place the intermediate coupling assembly 130 in a top jaw releasing 12 configuration. This set up can be performed whether or not the chuck 10 is mounted on the machine.

With the screw 94 backed off from a snug position (i.e., with intermediate coupling assembly 130 in the top jaw releasing configuration), the spring plunger 90 holds the intermediate coupling member 80 away from the master jaw 30 so that the bottom surface 84 of the coupling member 80 is not in contact with the bottom surface of the slot 34 of the master jaw 30. It can be appreciated that to allow for this clearance, the thickness of the lower flange 104 in the vertical direction is less than the thickness of the portions of the slot 34 beneath the retaining flanges 40. The retaining mechanism, comprising the screw 94 and the retaining member 120, is now in a released state, and the intermediate coupling assembly 130 is now loosely retained in the master jaw slot 34 by the pilot end 102 extending into the pilot hole 42 and by friction between the lower flange 104 and the retaining flange 40, which are urged into mutual contact by the spring plunger 90.

Figure 3:
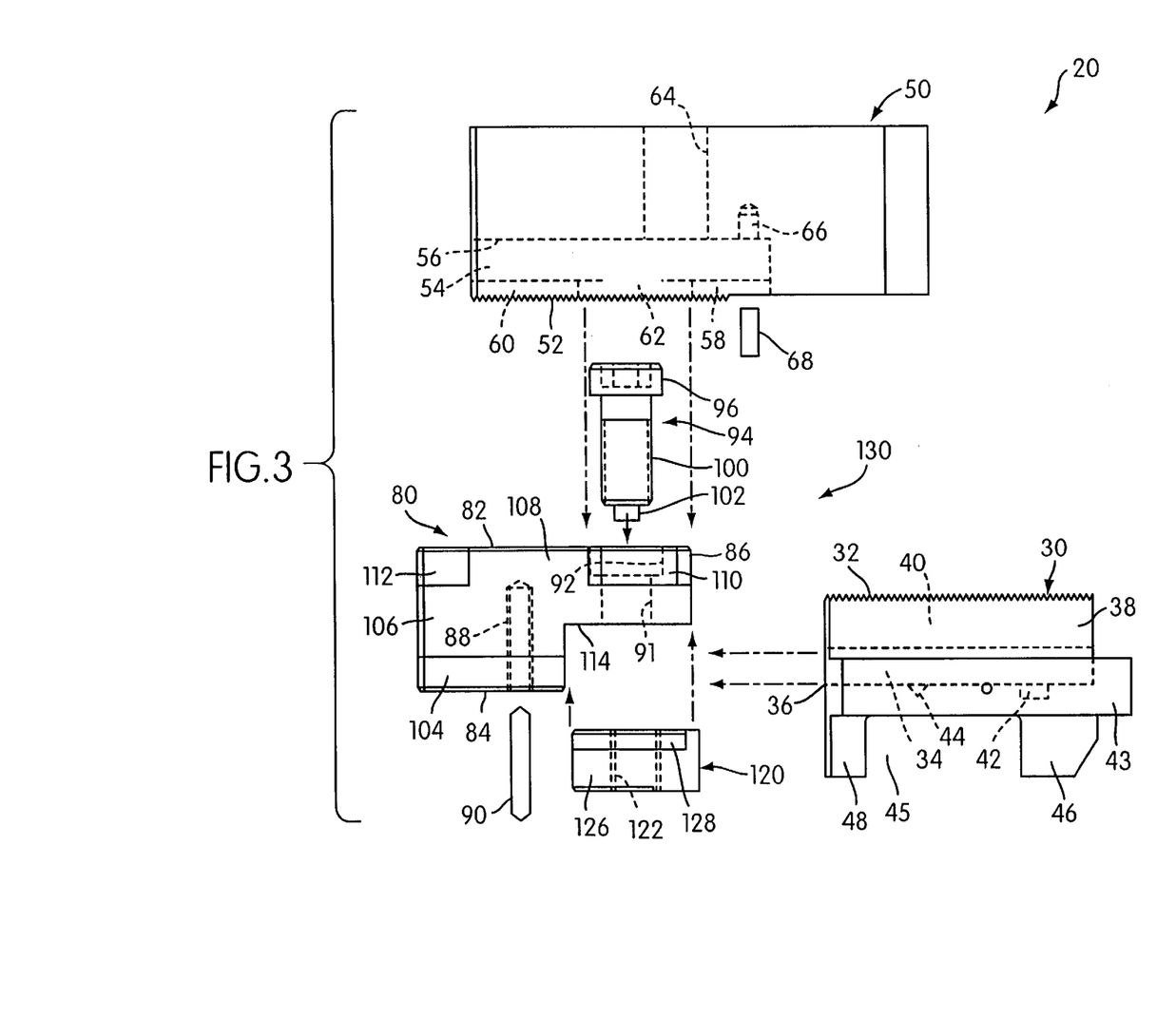
FIG. 3 is an exploded side elevation of the jaw assembly.

The top jaw 50 is then oriented with respect to the intermediate coupling member 80 as shown in FIGS. 1 and 3 so that the installation relief opening 62 of the top jaw 50 is generally aligned with the forward top flange 110 of the coupling member 80, and the rear slot tabs 60 of the top jaw 50 are generally aligned with the clearance notch 108 of the coupling member 80. Top jaw 50 is then lowered onto the intermediate coupling member 80 so that the top surface 82 of the coupling member 80 contacts the top surface 56 of the slot 54 of the top jaw 50. With the top jaw 50 supported by the intermediate coupling member 80 and with the coupling member 80 held away from the master jaw 30 by the spring plunger 90, the serrations 32 of the master jaw 30 do not engage the serrations 52 of the top jaw 50. The number of turns of the screw 94 necessary to provide clearance between the serrations 32 and the serrations 52 will depend on the pitch of the screw threads and the depth of the serrations. As noted above, ½ to 2 turns may be sufficient; one turn is preferred. The top jaw 50 can then be slid rearwardly (to the left in the figures) with respect to the coupling member 80 until the locating pin 68 contacts the front edge 86 of the coupling member 80. The locating pin 68 provides a precisely located hard stop for the intermediate coupling member 80 thereby permitting repeatable, accurate positioning of the top jaw 50. Pin 68 could be eliminated and slot 54 could be ended at the desired stop location for coupling member 80. The end of a slot, which is formed by a milling machine, cannot, however, be located as precisely as a pin. Moreover, a slot would necessarily have rounded corners at its end, which can cause the coupling member to become wedged into the slot. Accordingly, the pin 68 is preferred.

In this configuration, the forward and rear slot tabs 58, 60 of the top jaw 50 are retained beneath the forward and rear top flanges 110, 112, respectively, of the intermediate coupling member 80, and the serrations 52 of the top jaw 50 and the serrations 32 of the master jaw 30 are aligned for engagement. Screw 94 can then be tightened (approximately ½ to 2 turns and preferably about one turn); the clearance hole 64 in top jaw 50 permits access to the screw 94 with a hex wrench. Tightening of the screw 94 into the retaining member 120 draws the intermediate coupling member 80 down toward the master jaw 30. The intermediate coupling assembly 130 is now in a top jaw securing configuration as the forward and rear top flanges 110, 112 of the intermediate coupling member 80, in turn, pull down the top jaw 50 via the forward and rear slot tabs 58, 60 to thereby engage the serrations 52 of top jaw 50 with the serrations 32 of the master jaw 30.

If the screw 94 should back out by itself during operation of the jaw chuck 10, it can only back out until the top of the head 96 reaches the top surface 56 of the slot 54 of the top jaw 50. The clearance hole 64 has a diameter that is less than that of the head 96, so that the screw 94 cannot extend up into the clearance hole 64. Although backing out of the screw 94 can allow the serrations 32 and 52 to disengage due to the action of the spring plunger 90, the top jaw 50 is not thrown by centrifugal force because of the locating pin 68 engaging the front edge 86 of the intermediate coupling member 80. Moreover, the intermediate coupling assembly 130 cannot be thrown from the master jaw 30 because the pilot end 102 of the screw 94 is still engaged with the pilot hole 42 formed in the master jaw 30.

To remove the top jaw 50, the above-described procedure is merely reversed. That is, the screw 94 is loosened thereby releasing the retaining mechanism to change the intermediate coupling assembly 130 to the top jaw releasing configuration so that the top jaw 50 may be slid forward with respect to the intermediate coupling member 80 of the intermediate coupling assembly 130 until the forward top flange 110 of the coupling member 80 is aligned with the installation relief opening 62 of the top jaw 50 and the rear slot tabs 60 of the top jaw 50 are aligned with the clearance notch 108 of the coupling member 80. The top jaw 50 can then be lifted away from the intermediate coupling member 80. The intermediate coupling assembly 130 remains loosely retained within the master jaw slot 34, so a new top jaw can be installed by merely dropping it over the intermediate coupling member 80, sliding it rearwardly until the pin 68 contacts the front edge of the intermediate coupling member 80, and then retightening screw 94.

The arrangement of the top jaw 50 and the intermediate coupling member 80, whereby the top jaw 50 is engaged with the intermediate coupling member 80 by lowering the top jaw 50 onto the intermediate coupling member 80 from a position above the intermediate coupling member 80, permits the two components to be assembled to one another on the chuck body 12 without interference from the top jaws 50 of the other jaw assemblies 20 of the chuck 10. That is, as can be appreciated from FIG. 1, after one jaw assembly 20 is assembled, subsequent assemblies cannot be assembled by sliding the forward and rearward top flanges 110, 112 of the intermediate coupling member 80 into slot 54 of the top jaw 50 from the rear end of the slot 54, because the other top jaw(s) 50 would interfere with the positioning of the subsequent top jaw 50 all the way forward of the intermediate coupling member 80.

The installation and removal procedures are, of course, separately performed on each of the jaw assemblies 20 of the jaw chuck 10.

When the jaw assemblies 20 have been installed on the chuck 10 on a machine, the top jaws 50 can be custom bored to hold a required inside or outside diameter as known by those skilled in the art. After the jaws have been custom bored, they can be removed and subsequently reinstalled to the required position accuracy.

While the invention has been described in connection with what is presently considered to be the most practical and preferred embodiment, it is to be understood that the invention is not to be limited to the enclosed embodiment, but on the contrary is intended to cover various modifications and equivalent arrangements included within the spirit and scope of the appended claims.

Furthermore, it should be noted that where the appended claims do not include language in the 'means for performing a specified function' format permitted under 35 U.S.C. §112(¶6), it is intended that the appended claims not be interpreted under 35 U.S.C. §112(¶6) as being limited to the structure, material, or acts described in the present specification and their equivalents.

What is claimed is:

1. A quick-change jaw assembly for a jaw chuck for holding a workpiece to the spindle of a machine, the jaw chuck including a chuck body with radially-extending jaw guides formed therein, said jaw assembly comprising:

a master jaw disposed for radial movement within a one of the jaw guides, said master jaw having a first slot formed therein with retaining flanges formed along opposed sides of said first slot;

a intermediate coupling member slidable into said first slot, said intermediate coupling member having a lower flange that co-acts with said retaining flanges of said master jaw to retain said intermediate coupling member in said first slot, said intermediate coupling member having first and second upper flanges separated by a clearance gap;

a top jaw having a second slot formed therein and first and second slot tabs disposed along portions of said second slot and separated by a clearance gap, wherein said first and second upper flanges of said intermediate coupling member, said second slot, and said first and second slot tabs are constructed and arranged to permit said top jaw to be coupled to said intermediate coupling member by: (1) aligning said second slot tabs of said top jaw with said clearance gap of said intermediate coupling member and aligning said first upper flanges of said intermediate coupling member with said clearance gap of said top jaw, (2) engaging said top jaw with said intermediate coupling member to place said first upper flanges of said intermediate coupling member into said second slot, and (3) moving said top jaw with respect to said intermediate coupling member to place said first and second upper flanges in overlapping relation with respect to said first and second slot tabs, respectively;

a retaining member disposed in said first slot adjacent said intermediate coupling member and including lateral steps constructed and arranged to co-act with said retaining flanges of said master jaw to secure said retaining member in said first slot, said retaining member having a threaded aperture formed therein; and a screw having a head and a threaded shank, said screw extending through a screw aperture formed in said intermediate coupling member and engaging said threaded aperture of said retaining member, said intermediate coupling member including a counter-bore formed coaxially with said screw aperture, said head of said screw being retained in said counter bore when said threaded shank engages said threaded aperture of said retaining member, whereby tightening said screw into said threaded aperture of said retaining member draws said intermediate coupling member toward said master jaw, thereby drawing said top jaw toward said master jaw via the overlapping relationship of said first and second upper flanges of said intermediate coupling member with respect to said first and second slot tabs, respectively.

2. A quick-change jaw assembly for a jaw chuck for holding a workpiece to the spindle of a machine, the jaw chuck including a chuck body with radially-extending jaw guides formed therein and a master jaw disposed for radial movement within each of the jaw guides, the master jaw having a master jaw slot formed therein with retaining flanges formed along opposed sides of the master jaw slot, said jaw assembly comprising:

an intermediate coupling member slidable into the master jaw slot, said intermediate coupling member having a lower flange that co-acts with the retaining flanges of the master jaw to retain said intermediate coupling member in the master jaw slot, said intermediate coupling member having first and second upper flanges separated by a clearance gap;

a top jaw having a top jaw slot formed therein and first and second slot tabs disposed along portions of said top jaw slot and separated by a clearance gap, wherein said first and second upper flanges of said intermediate coupling member, said top jaw slot, and said first and second slot tabs are constructed and arranged to permit said top jaw to be coupled to said intermediate coupling member by: (1) aligning said second slot tabs of said top jaw with said clearance gap of said intermediate coupling member and aligning said first upper flanges of said intermediate coupling member with said clearance gap of said top jaw, (2) engaging said top jaw with said intermediate coupling member to place said first upper flanges of said intermediate coupling member into said top jaw slot, and (3) moving said top jaw with respect to said intermediate coupling member to place said first and second upper flanges in overlapping relation with respect to said first and second slot tabs, respectively;

a retaining member disposed in the master jaw slot adjacent said intermediate coupling member and including lateral steps constructed and arranged to co-act with the retaining flanges of the master jaw to secure said retaining member in the master jaw slot, said retaining member having a threaded aperture formed therein; and a screw having a head and a threaded shank, said screw extending through a screw aperture formed in said intermediate coupling member and engaging said threaded aperture of said retaining member, said intermediate coupling member including a counter-bore formed coaxially with said screw aperture, said head of said screw being retained in said counter bore when said threaded shank engages said threaded aperture of said retaining member whereby tightening said screw into said threaded aperture of said retaining member draws said intermediate coupling member toward the master jaw, thereby drawing said top jaw toward the master jaw via the overlapping relationship of said first and second upper flanges of said intermediate coupling member with respect to said first and second slot tabs, respectively.

3. A quick-change jaw assembly for a jaw chuck for holding a workpiece to the spindle of a machine, the jaw chuck including a rotatable chuck body with radially-extending jaw guides formed therein and a master jaw disposed for reciprocal radial movement within each of the jaw guides, the master jaw having a master jaw slot formed therein with retaining flanges formed along opposed sides of the master jaw slot, said jaw assembly comprising:

an intermediate coupling member slidable into the master jaw slot, said intermediate coupling member having a first flange structure that co-acts with the retaining flanges of the master jaw to retain said intermediate coupling member in the master jaw slot and a second flange structure;

a top jaw having a top jaw slot formed therein and retaining tabs disposed along opposite sides of said top jaw slot, said top jaw slot being constructed and arranged to permit said top jaw to be coupled to said intermediate coupling member by receiving a portion of said intermediate coupling member with said retaining tabs in overlying relation with said second flange structure of said intermediate coupling member; and a retaining mechanism cooperatively engaged with said intermediate coupling member and the master jaw slot and constructed and arranged to (1) be tightened to snugly secure said intermediate coupling member within the master jaw slot, thereby retaining said top jaw to the master jaw by co-action of said retaining tabs of said top jaw and said second flange structure of said intermediate coupling member or (2) be released to permit said top jaw to be uncoupled from said intermediate coupling member while loosely retaining said intermediate coupling member in the master jaw slot.

4. The quick change jaw assembly of claim 3, said second flange structure of said intermediate coupling member comprising first and second flanges longitudinally separated by a clearance gap, and said retaining tabs of said top jaw comprising first and second slot tabs disposed along portions of said top jaw slot and longitudinally separated by a clearance gap, wherein said first and second flanges of said intermediate coupling member, said top jaw slot, and said first and second slot tabs are constructed and arranged to permit said top jaw to be coupled to said intermediate coupling member by: (1) aligning said second slot tabs of said top jaw with said clearance gap of said intermediate coupling member and aligning said first flanges of said intermediate coupling member with said clearance gap of said top jaw, (2) engaging said top jaw with said intermediate coupling member to place said first flanges of said intermediate coupling member into said second slot, and (3) moving said top jaw with respect to said intermediate coupling member to place said first and second flanges in overlapping relation with respect to said first and second slot tabs, respectively.

5. The quick-change jaw assembly of claim 3, said retaining mechanism comprising:

a retaining member disposed in the master jaw slot adjacent said intermediate coupling member and including lateral steps constructed and arranged to co-act with the retaining flanges of the master jaw to secure said retaining member in the master jaw slot, said retaining member having a threaded aperture formed therein; and a screw having a head and a threaded shank, said screw extending through a screw aperture formed in said intermediate coupling member and engaging said threaded aperture of said retaining member, said intermediate coupling member including a counter-bore formed coaxially with said screw aperture, said head of said screw being retained in said counter bore when said threaded shank engages said threaded aperture of said retaining member, whereby tightening said screw into said threaded aperture of said retaining member draws said second flange structure of said intermediate coupling member toward the master jaw, thereby drawing said top jaw toward the master jaw via the overlapping relationship of said second flange structure of said intermediate coupling member with respect to said slot tabs of said top jaw.

6. The quick-change jaw assembly of claim 3, wherein said top jaw includes a serrated surface constructed and arranged to operatively engage a serrated surface of the master jaw when said retaining mechanism secures said intermediate coupling member to within the master jaw slot.

7. The quick-change jaw assembly of claim 3, further comprising a spring plunger disposed in a hole provided in said intermediate coupling member, said spring plunger being biased so as to project from said hole so as to engage a bottom surface of the master jaw slot so as to resiliently urge a bottom surface of said intermediate coupling member away from the bottom surface of the master jaw slot when said retaining mechanism is released.

8. The quick-change jaw assembly of claim 3, further comprising a locating pin extending from said top jaw to engage an edge of said intermediate coupling member when said top jaw is coupled to said intermediate coupling member to thereby establish a preferred position of said top jaw with respect to said intermediate coupling member.

9. A quick-change jaw assembly for a jaw chuck for holding a workpiece to the spindle of a machine, the jaw chuck including a rotatable chuck body with radially-extending jaw guides formed therein, said jaw assembly comprising:

a master jaw disposed for reciprocal radial movement within each of the jaw guides, said master jaw having a master jaw slot formed therein with retaining flanges formed along opposed sides of said master jaw slot;

an intermediate coupling member slidable into said master jaw slot, said intermediate coupling member having a first flange structure that co-acts with said retaining flanges of said master jaw to retain said intermediate coupling member in said master jaw slot and a second flange structure adapted to engage a top jaw coupled to said intermediate coupling member; and a retaining mechanism cooperatively engaged with said intermediate coupling member and the master jaw slot and constructed and arranged to (1) be tightened to snugly secure said intermediate coupling member within the master jaw slot or (2) be released to loosely retain said intermediate coupling member in the master jaw slot.

10. The quick-change jaw assembly of claim 9, further comprising a top jaw having a top jaw slot formed therein and retaining tabs disposed along opposite sides of said top jaw slot, said top jaw slot being constructed and arranged to permit said top jaw to be coupled to said intermediate coupling member by receiving a portion of said intermediate coupling member with said retaining tabs in overlying relation with said second flange structure of said intermediate coupling member, wherein tightening said retaining mechanism retains said top jaw to the master jaw by coaction of said retaining tabs of said top jaw and said second flange structure of said intermediate coupling member and releasing said retaining mechanism permits said top jaw to be uncoupled from said intermediate coupling member.

11. The quick-change jaw assembly of claim 9, said retaining mechanism comprising:

a retaining member disposed in said master jaw slot adjacent said intermediate coupling member and including lateral steps constructed and arranged to co-act with said retaining flanges of said master jaw to secure said retaining member in said master jaw slot, said retaining member having a threaded aperture formed therein; and a screw having a head and a threaded shank, said screw extending through a screw aperture formed in said intermediate coupling member and engaging said threaded aperture of said retaining member, said intermediate coupling member including a counter-bore formed coaxially with said screw aperture, said head of said screw being retained in said counter bore when said threaded shank engages said threaded aperture of said retaining member, whereby tightening said screw into said threaded aperture of said retaining member draws said second flange structure of said intermediate coupling member toward said master jaw.

12. The quick-change jaw assembly of claim 11, said screw further comprising a pilot end extending from said threaded shank wherein said pilot end projects from said threaded aperture of said retaining member so as to engage a pilot hole formed in said master jaw slot to prevent said intermediate coupling member and said retaining mechanism from sliding out of said master jaw slot.

13. The quick-change jaw assembly of claim 11, further comprising a spring plunger disposed in a hole provided in said intermediate coupling member, said spring plunger being biased so as to project from said hole so as to engage a detent formed in a bottom surface of said master jaw slot so as to resiliently urge a bottom surface of said intermediate coupling member away from the bottom surface of said master jaw slot when said retaining mechanism is released.

14. A top jaw adapted to be coupled to a master jaw of a jaw chuck for holding a workpiece to the spindle of a machine, said top jaw comprising a body having a longitudinal slot formed therein and extending from one end of the body to an intermediate location within the body, and first and second slot tabs disposed along portions of said longitudinal slot, said first and second slot tabs each having an exposed upper load-bearing surface adapted to engage a coupling member, said first and second slot tabs being longitudinally separated, thereby defining a clearance gap therebetween.

15. A top jaw as in claim 14, wherein the exposed upper load-bearing surfaces of the first and second slot tabs are generally parallel with an upper surface of the longitudinal slot.

16. A top jaw as in claim 15, wherein the exposed upper load-bearing surfaces of the first and second slot tabs are in the same plane.

17. A top jaw as in claim 14, wherein the exposed upper load-bearing surfaces of the first and second slot tabs are in the same plane.

* * * * *